US006975430B1

(12) United States Patent
Tomita

(10) Patent No.: US 6,975,430 B1

(45) Date of Patent: Dec. 13, 2005

(54) METHOD AND APPARATUS FOR ADJUSTING INK SUPPLY AMOUNT FOR PRINTING PRESS

(75) Inventor: Toshikazu Tomita, Ibaragi (JP)

(73) Assignee: Komori Corporation, Tokyo (JP)

( * ) Notice: Subject to any disclaimer, the term of this patent is extended or adjusted under 35 U.S.C. 154(b) by 984 days.

(21) Appl. No.: 09/655,537

(22) Filed: Sep. 6, 2000

(30) Foreign Application Priority Data

Sep. 6, 1999 (JP) ................................ 11/251711

(51) Int. Cl.[7] .......................... G06F 15/00; B41F 31/02

(52) U.S. Cl. ....................................... 358/1.9; 101/367

(58) Field of Search ......................... 358/1.9, 504, 296, 358/1.2; 101/365, 367, 368, 300, 295, 210, 101/212, 225

(56) References Cited

U.S. PATENT DOCUMENTS 3,958,509 A 5/1976 Murray et al.
4,763,359 A * 8/1988 Tsunoda et al. ............ 382/112
5,070,784 A * 12/1991 Nishida et al. ............. 101/365
5,224,421 A * 7/1993 Doherty ...................... 101/211
5,357,448 A * 10/1994 Stanford ..................... 382/112
5,524,542 A * 6/1996 Toyama ....................... 101/485
5,832,830 A * 11/1998 Rancourt et al. ........... 101/365
5,903,712 A * 5/1999 Wang et al. ................. 358/1.9
5,921,184 A * 7/1999 Sugiyama et al. .......... 101/484
6,006,662 A * 12/1999 Ishida et al. ................ 101/141
6,318,260 B1 * 11/2001 Chu et al. .................... 101/365
6,378,429 B1 * 4/2002 Tomita et al. .............. 101/365
6,412,411 B1 * 7/2002 Sugiyama et al. .......... 101/365
6,553,909 B2 * 4/2003 Saito .......................... 101/348
6,629,497 B2 * 10/2003 Tokiwa ........................ 101/365
6,684,780 B2 * 2/2004 Shiraishi ..................... 101/365
6,834,590 B2 * 12/2004 Naniwa ...................... 101/491

FOREIGN PATENT DOCUMENTS

| | | | |
|---|---|---|---|
| DE | 32 26 144 | 2/1983 | |
| DE | 41 28 537 | 3/1993 | |
| DE | 195 17 154 | 11/1996 | |
| EP | 816 074 | 1/1998 | |
| JP | 02002120354 A * | 4/2002 | ........... B41F 31/02 |

* cited by examiner

*Primary Examiner*—Madeleine Nguyen

(74) *Attorney, Agent, or Firm*—Blakely, Sokoloff, Taylor & Zafman

(57) ABSTRACT

In an ink supply amount adjusting method for this printing machine, reference opening amounts of ink fountain keys are obtained in accordance with image area ratios of respective areas, corresponding to the ink fountain keys, of a plate by following a preset relationship between an image area ratio and opening amounts of the ink fountain keys. The obtained reference opening amounts are uniformly corrected with preset correction values, thereby obtaining set values of the opening amounts of the ink fountain keys. An ink supply amount adjusting apparatus is also disclosed.

20 Claims, 16 Drawing Sheets

METHOD AND APPARATUS FOR ADJUSTING INK SUPPLY AMOUNT FOR PRINTING PRESS

BACKGROUND OF THE INVENTION

The present invention relates to a method and apparatus for adjusting an ink supply amount for a printing press, which adjust the amount of ink to be supplied to a plate by adjusting setting of the opening amount of an ink fountain key and the feed rate (rotation amount) of an ink fountain roller.

A four-color rotary printing press shown in FIG. 16 has printing units 9-1 to 9-4 provided for four ink colors. An ink supply unit shown in FIG. 15 is provided in each of the printing units 9-1 to 9-4.

The ink supply unit shown in FIG. 15 has an ink fountain 1, an ink 2 stored in the ink fountain 1, an ink fountain roller 3, a plurality of ink fountain keys 4 (4-1 to 4-n) aligned in the axial direction of the ink fountain roller 3, an ink ductor roller 5, an ink roller group 6, a plate 7, and a plate cylinder 8.

In the printing press having the above arrangement, the amount of ink to be supplied from the ink fountain 1 to the ink fountain roller 3 is adjusted by adjusting the opening amounts of the ink fountain keys 4. The amount of ink to be supplied from the ink fountain roller 3 to the plate 7 through the ink roller group 6 is adjusted by adjusting the feed rate (rotation amount) of the ink fountain roller 3. A print sheet is printed with the ink finally supplied to the plate 7.

The opening amount of each ink fountain key 4 is set in accordance with the image area ratio of each of areas, corresponding to the ink fountain keys 4, of the plate 7 by following the "conversion curve of the image area ratio to the opening amount of the ink fountain key" stored in advance. The feed rate of the ink fountain roller 3 is set in accordance with a predetermined reference ink feed rate. The opening amounts of the ink fountain keys 4 and the feed rate of the ink fountain roller 3 (ink feed rate) are set in units of printing units 9-1 to 9-4. More specifically, the "conversion curve of the image area ratio to the opening amount of the ink fountain key" and the reference ink feed rate are determined in units of ink colors.

Conventionally, since the "conversion curve of the image area ratio to the opening amount of the ink fountain key" and the reference ink feed rate are uniquely determined by the printing machine manufacturer, differences in standard density among the printing companies and differences depending on the environment are not considered. For this reason, the operator of each printing company actually checks the color of the printed printing product after the opening amounts of the respective ink fountain keys 4 and the feed rate of the ink fountain roller 3 are set by using the standard characteristics in units of printing units 9-1 to 9-4.

In accordance with the result of color checking, the operator finely adjusts the opening amounts of the ink fountain keys 4 separately, or the feed rate of the ink fountain roller 3, thereby dealing with the differences in standard density and the differences depending on the environment. This fine adjustment of the amount of ink to be supplied requires a very advanced technique and can be performed only by a skilled operator. The fine adjustment takes a very long period of time, leading to a delay in printing operation.

Also, conventionally, the "conversion curve of the image area ratio to the opening amount of the ink fountain key" and the reference ink feed rate must be stored in units of ink colors, and a very large memory capacity is accordingly necessary.

SUMMARY OF THE INVENTION

It is an object of the present invention to provide a method and apparatus for adjusting an ink supply amount for a printing press, which can perform color matching for actual printing and set and adjust the amount of ink to be supplied easily and within a short period of time.

It is another object of the present invention to provide a method and apparatus for adjusting an ink supply amount for a printing press, which do not require a very large memory capacity.

In order to achieve the above objects, according to the present invention, there is provided an ink supply amount adjusting method for a printing press having an ink fountain for storing an ink, an ink fountain roller to which the ink is supplied from the ink fountain, a plurality of ink fountain keys aligned in an axial direction of the ink fountain roller to adjust an amount of ink to be supplied from the ink fountain to the ink fountain roller, and an ink roller group for supplying the ink to a plate in an amount adjusted in accordance with a feed rate of the ink fountain roller, comprising the steps of obtaining reference opening amounts of the ink fountain keys in accordance with image area ratios of respective areas, corresponding to the ink fountain keys, of the plate by following a preset relationship between an image area ratio and opening amounts of the ink fountain keys, and uniformly correcting the obtained reference opening amounts of the ink fountain keys with preset correction values, thereby obtaining set values of the opening amounts of the ink fountain keys.

DESCRIPTION OF THE PREFERRED EMBODIMENTS

Figure 15:
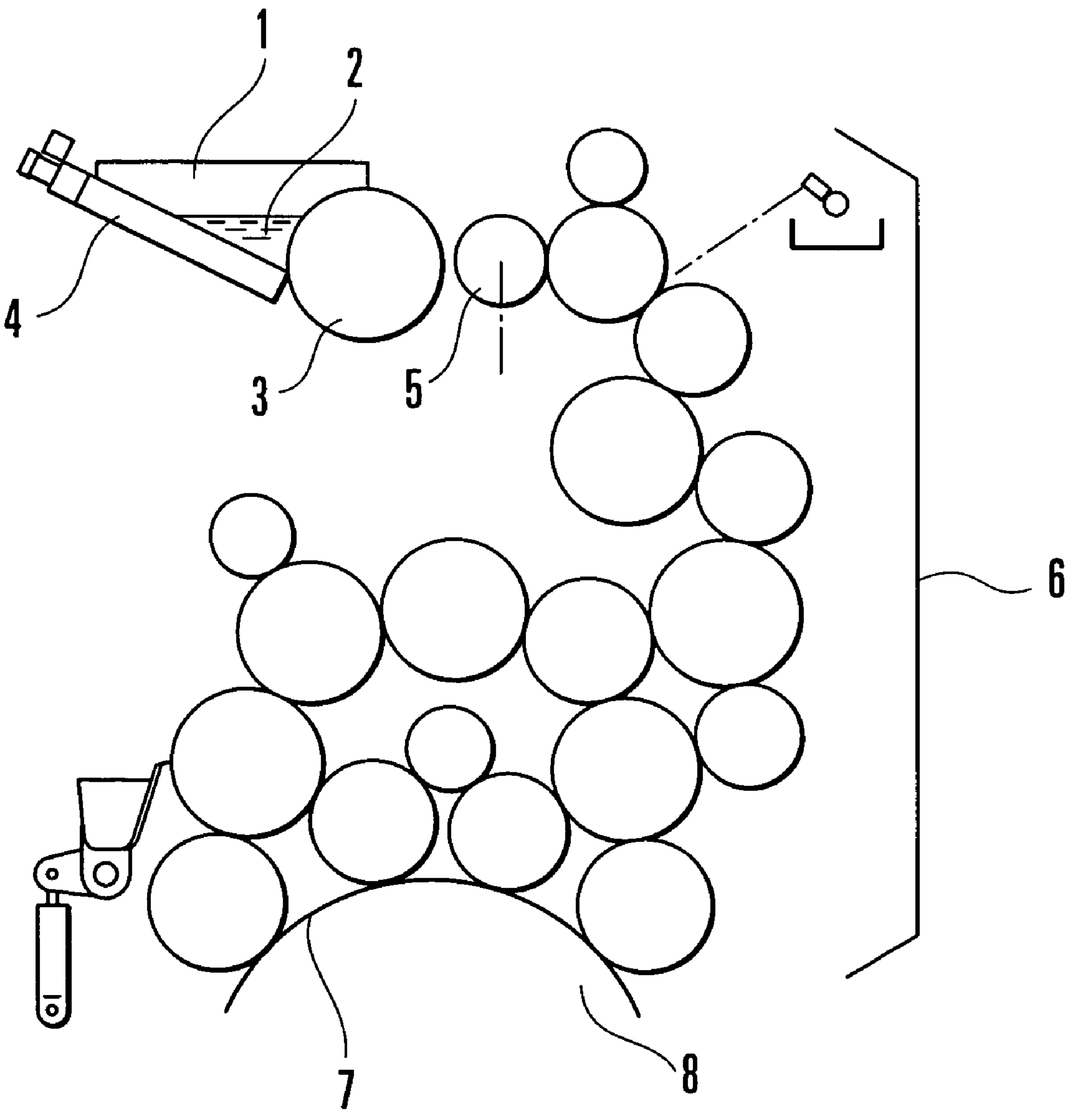
FIG. 15 is a view schematically showing an ink supply unit for a printing unit of each ink color in a rotary printing press.
Figure 16:
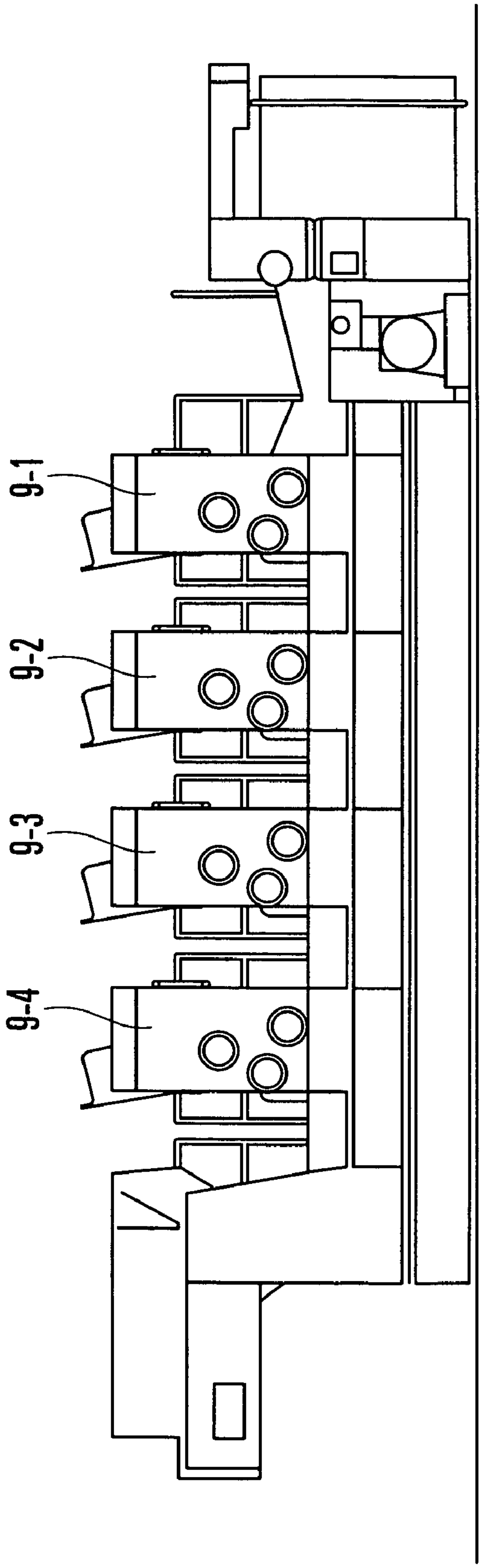
FIG. 16 is a side view schematically showing a four-color rotary printing press.

The present invention will be described in detail with reference to the accompanying drawings. In the following description, FIGS. 15 and 16 are also referred to.

First Embodiment

Figure 1:
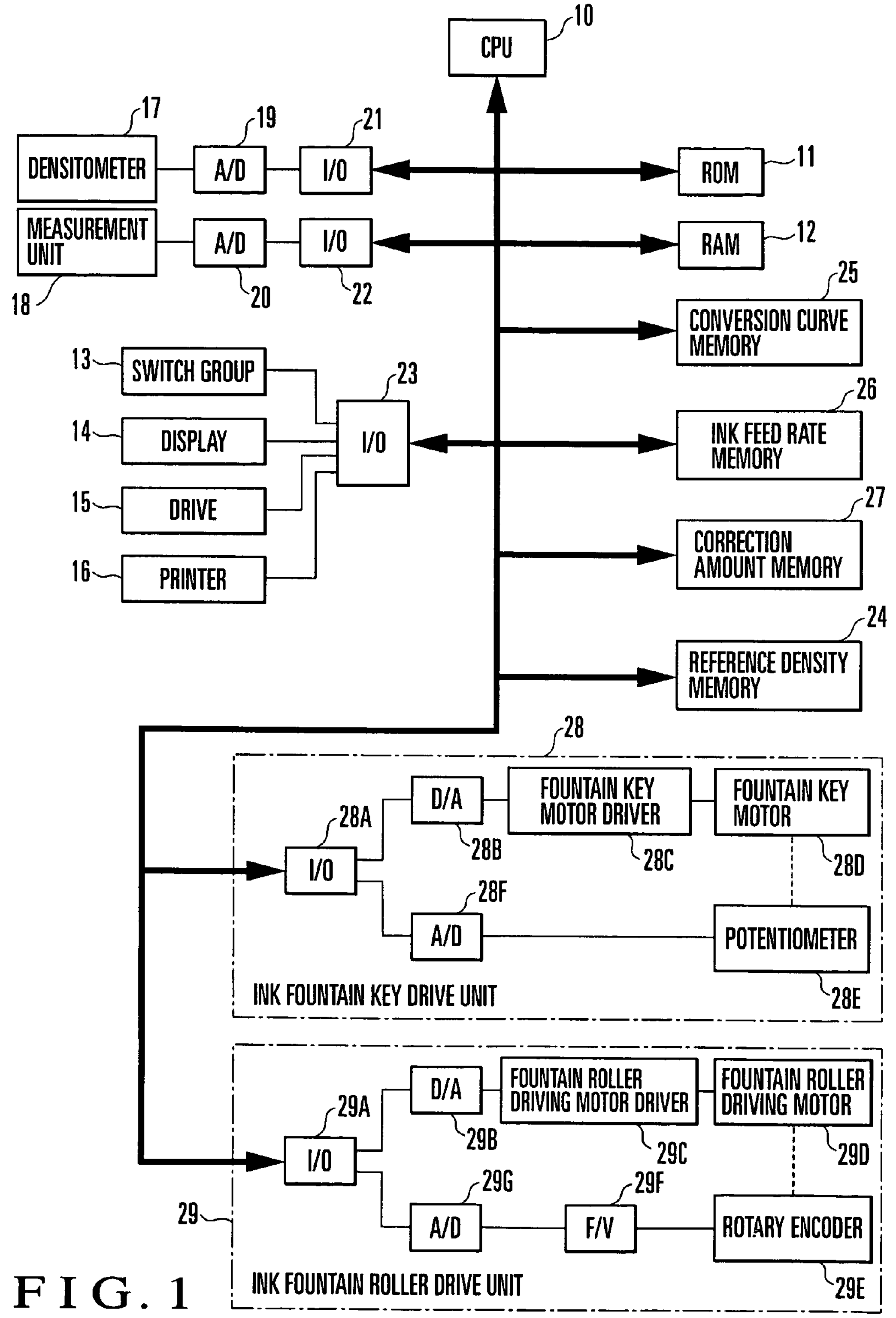
FIG. 1 is a block diagram of an ink supply amount adjusting apparatus for a printing press according to the first embodiment of the present invention.

FIG. 1 shows an ink supply amount adjusting apparatus for a printing press according to the first embodiment of the present invention. Referring to FIG. 1, the ink supply amount adjusting apparatus is comprised of a CPU (Central Processing Unit) 10, a ROM (Read Only Memory) 11, a RAM (Random Access Memory) 12, a switch group 13, a display 14, a drive 15 for a floppy disk or magnetic card, a printer 16, a densitometer 17, a measurement unit 18 for measuring the plate image area ratio of a testing plate, A/D (Analog-to-Digital) converters 19 and 20, input/output (I/O) interfaces 21 to 23, a reference density memory 24, a conversion curve memory 25, an ink feed rate memory 26, a correction amount memory 27, an ink fountain key drive unit 28, and an ink fountain roller drive unit 29.

The CPU 10 obtains various kinds of input information supplied through the input/output interfaces 21 to 23 and performs various processing operations in accordance with programs stored in the ROM 11 while accessing the RAM 12.

The standard densities in units of respective ink colors unique to the printing company (in units of printing units) are stored in the reference density memory 24 if necessary. Usually, when the printing press is shipped from the manufacturer, standard densities in units of ink colors are stored in the memory 24. The "conversion curve of the image area ratio to the opening amount of the ink fountain key" for each ink color is stored in the conversion curve memory 25. When the printing press is shipped from the manufacturer, the one and only standard characteristic for each ink color is stored in the memory 25.

The ink feed rates in units of ink colors are stored in the ink feed rate memory 26. When the printing press is shipped from the manufacturer, the reference ink feed rates in units of ink colors are stored in the memory 26 as the standard values. The correction amounts (increments/decrements) of the opening amounts of the ink fountain keys in units of ink colors are stored in the correction amount memory 27 as the uniform values for the respective ink fountain keys 4. More specifically, correction amounts common to all the ink fountain keys 4 (FIG. 15) are set as the correction amounts of the opening amounts of the ink fountain keys in units of ink colors. When the printing press is shipped from the manufacturer, the correction amounts of the opening amounts of the ink fountain keys are set to 0 for each ink color.

The ink fountain key drive unit 28 is separately provided to correspond to each ink fountain key 4 of each of the printing units 9-1 to 9-4. More specifically, in each of the printing units 9-1 to 9-4, n (n is a positive integer of 2 or more) ink fountain key drive units 28 are provided to correspond to the n ink fountain keys 4. In this case, the opening amounts of the n ink fountain keys 4 with respect to the ink fountain roller 3 are separately adjusted by the n ink fountain key drive units 28 having the same arrangement.

The ink fountain key drive unit 28 has an input/output interface 28A, a D/A converter 28B, a fountain key motor driver 28C, a fountain key motor 28D, a potentiometer 28E added to the fountain key motor 28D, and an A/D converter 28F.

The ink fountain roller drive unit 29 is separately provided to correspond to each ink fountain roller 3 of each of the printing units 9-1 to 9-4. More specifically, in the four-color printing press, four ink fountain roller drive units 29 are provided to correspond to the four printing units 9-1 to 9-4. In this case, the feed rates of the ink fountain rollers 3 of the respective printing units 9-1 to 9-4 are separately adjusted by the four ink fountain roller drive units 29 having the same arrangement.

The ink fountain roller drive unit 29 has an input/output interface 29A, a D/A converter 29B, a fountain roller driving motor driver 29C, a fountain roller driving motor 29D, a rotary encoder 29E added to the fountain roller driving motor 29D, an F/V converter 29F, and an A/D converter 29G.

[How to Adjust Correction Amount of Opening Amount of Ink Fountain Key and Ink Feed Rate in Adjustment Before Actual Printing (FIG. 2)]

Figure 4:
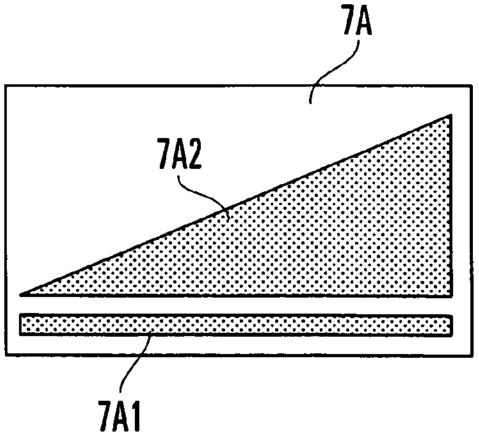
FIG. 4 is a plan view of a testing plate used in the ink supply amount adjusting apparatus of FIG. 1.

Prior to the start of printing, the correction amounts of the opening amounts of the ink fountain keys in units of ink colors stored in the correction amount memory 27 and the ink feed rates in units of ink colors stored in the ink feed rate memory 26 are adjusted. In this adjustment, testing plates 7A having the same image as shown in FIG. 4 are used in units of ink colors. A color patch portion 7A1 and ink supply amount adjusting image portion 7A2 are formed on each testing plate 7A.

The color patch portion 7A1 is a known image portion used for measuring printing quality, and is constituted by a plurality of patches (not shown) which are printed in the respective areas corresponding to the ink fountain keys 4 to be continuous in the direction of array of the ink fountain keys 4. The ink supply amount adjusting image portion 7A2 has a right-angled triangular shape, and the image area ratios within the respective areas corresponding to the ink fountain keys 4 gradually change in the direction along which the ink fountain keys 4 are aligned.

To adjust the correction amounts of the opening amounts of the ink fountain keys 4 and the ink feed rate, the operator measures the image area ratios of the testing plate 7A with the measurement unit 18 and supplies them to the CPU 10

(step S101). More specifically, the operator measures the image area ratios, corresponding to the ink fountain keys 4, of the respective areas of the testing plate 7A, and supplies them to the CPU 10 through the A/D converter 20 and input/output interface 22.

The CPU 10 calculates the reference opening amounts of the ink fountain keys 4 of the respective ink colors in accordance with the image area ratios, corresponding to the ink fountain keys 4, of the respective areas of the testing plate 7A by following the "conversion curve (standard characteristics) of the image area ratio to the opening amount of the ink fountain key" for each ink color (step S102) and stored in the conversion curve memory 25 in advance.

The (reference) ink feed rates in units of ink colors are read out from the ink feed rate memory 26 (step S103), and the readout ink feed rates of the respective ink colors are set in the ink fountain rollers 3 of the printing units 9-1 to 9-4 through the ink fountain roller drive unit 29. The reference opening amounts of the ink fountain keys 4 of the respective ink colors obtained in step S102 are also set through the ink fountain key drive unit 28 (step S104).

With the four testing plates 7A being set on the plate cylinders 8 of the respective ink colors, the operator performs printing to acquire a printing sample (step S105). The density of each ink color of the acquired printing sample is measured with the densitometer 17 (step S106), and is supplied to the CPU 10 through the A/D converter 19 and input/output interface 21. On the basis of data supplied from the densitometer 17, the CPU 10 checks whether the density (measured density) of each area, corresponding to the ink fountain key 4, of each ink color of the printing sample coincides with the corresponding reference density (the reference density unique to the printing company) of each ink color stored in the reference density memory 24 in advance (step S107).

If the measured density and the reference density do not coincide with each other, i.e., if the difference between the measured density and reference density is not zero or does not fall within a predetermined range, the CPU 10 determines that the density must be adjusted. For the sake of descriptive convenience, assume that the measured density and the reference density do not coincide with each other in all areas of the respective ink colors.

When the density need be adjusted, the operator adjusts the correction amounts of the opening amounts of the ink fountain keys in units of ink colors stored in the correction amount memory 27 and the ink feed rates of the respective ink colors stored in the ink feed rate memory 26 (step S108). More specifically, the operator increases or decreases the current correction amounts of the opening amounts of the ink fountain keys of the respective ink colors and the current ink feed rates in units of ink colors while monitoring them displayed on the display 14. The adjusted correction amounts of the opening amounts of the ink fountain keys and the adjusted ink feed rates, of the respective ink colors are overwritten in the correction amount memory 27 and ink feed rate memory 26.

The CPU 10 reads out the adjusted correction amounts of the opening amounts of the ink fountain keys of the respective ink colors from the correction amount memory 27 (step S109). The CPU 10 then adds the readout correction amounts of the opening amounts of the ink fountain keys of the respective ink colors to the reference opening amounts of the ink fountain keys 4 of the respective ink colors obtained in step S102, thereby correcting the opening amounts of the ink fountain keys 4 of the respective ink colors (step S110). More specifically, if the correction amounts are positive values, they are uniformly added to the opening amounts of the ink fountain keys 4; if they are negative values, they are uniformly subtracted from the opening amounts of the ink fountain keys 4.

The CPU 10 then reads out the adjusted ink feed rates of the respective ink colors from the ink feed rate memory 26 (step S111). The readout ink feed rates of the respective ink colors, and the opening amounts of the ink fountain keys 4 of the respective ink colors corrected in step S110, are set in the CPU 10 through the ink fountain roller drive unit 29 and ink fountain key drive unit 28 (step S112).

Figure 5A:
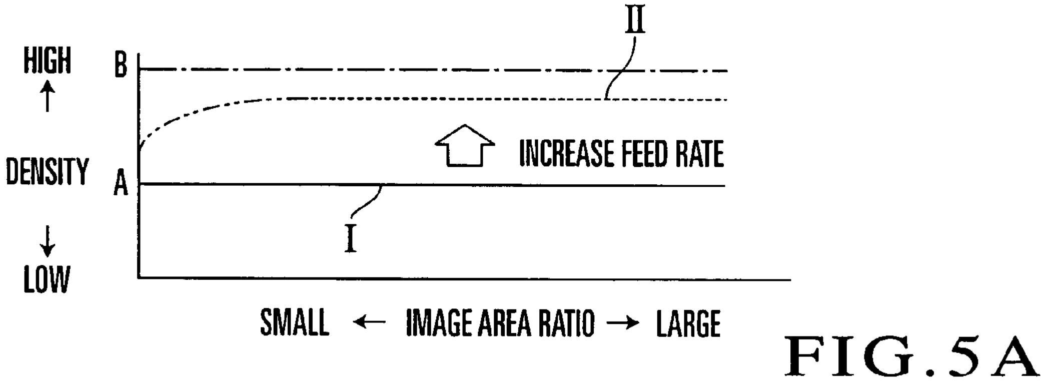
FIGS. 5A to 5C are graphs showing the relationship among the opening amount of the ink fountain key, the ink feed rate, and the reference printing density.

In each ink color, if the measured density obtained in step S107 is a constant value A, as indicated by a characteristic curve I shown in FIG. 5A, regardless of the image area ratio, this characteristic curve is changed by adjusting the ink feed rate in step S112. For example, when the ink feed rate is increased, the density increases, as indicated by a characteristic curve II. The density does not increase sharply at a portion with a low image area ratio, but increases gradually as the image area ratio increases, and stays at a substantially constant value when the image area ratio reaches a certain value.

Figure 5B:
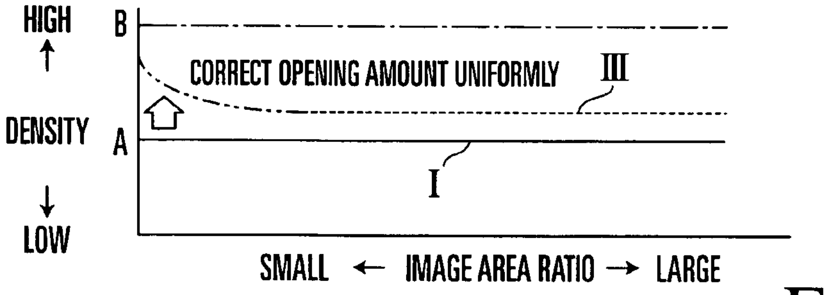

In each ink color, if the measured density obtained in step S107 is a constant value A, as indicated by a characteristic curve I shown in FIG. 5B, regardless of the image area ratio, this characteristic curve is changed by adjusting the opening amounts of the respective ink fountain keys 4 in step S112. For example, when the opening amounts of the ink fountain keys 4 are uniformly increased, the density increases, as indicated by a characteristic curve III. The density increases largely at a portion with a low image area ratio, but decreases gradually as the image area ratio increases, and stays at substantially a constant value when the image area ratio reaches a certain value.

Figure 5C:
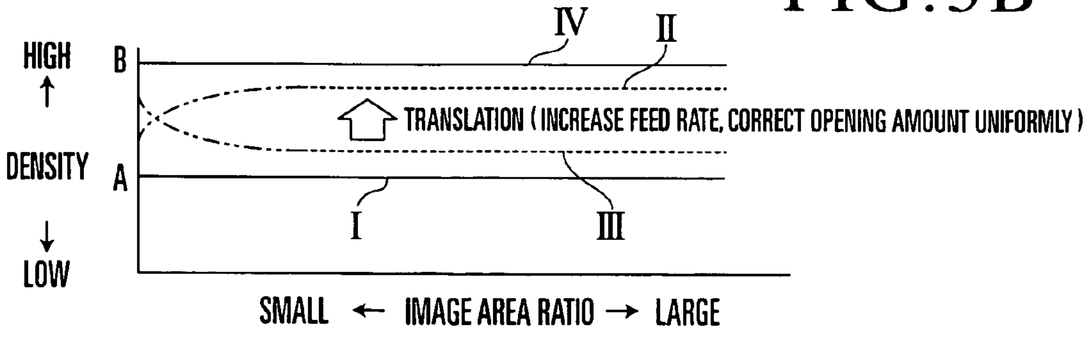

In step S112, since both the ink feed rates and the opening amounts of the ink fountain keys are adjusted, the characteristic curves II and III are combined to provide a characteristic curve IV, as shown in FIG. 5C. The printing density of each ink color can be adjusted to a desired density (reference density) B by translation without changing the "conversion curve of the image area ratio to the opening amount of the ink fountain key" for each ink color and stored in the conversion curve memory 25.

After this adjustment, the operator performs printing again with the testing plate 7A being set on the plate cylinder 8 of each ink color, and acquires a printing sample (step S113). The operator then measures the density of each ink color of the acquired printing sample (step S114). The CPU 10 checks whether the measured density of each area, corresponding to the ink fountain key 4, of the corresponding ink color of the acquired printing sample coincides with the reference density in the same manner as in the previous step S107 (step S115).

The CPU 10 repeats the steps S108 to S115 until the measured densities of all areas of the respective ink colors coincide with the reference densities. When the measured densities of all areas of the respective ink colors coincide with the reference densities, the CPU 10 ends adjustment of the correction amounts of the opening amounts of the ink fountain keys and the ink feed rates performed before the start of printing.

[How to Set Ink Supply Amount at Start of Actual Printing (FIG. 3)]

Prior to the start of printing with the plate 7 of each ink color being mounted, the operator separately measures the image area ratio of the plate 7 of each ink color with the plate image area ratio measurement unit 18, and supplies the obtained ratio to the CPU 10 (step S201). More specifically, the operator measures the image area ratios, corresponding to the ink fountain keys 4, of the respective areas of the plates 7 of the respective ink colors, and supplies the measured image area ratios to the CPU 10 through the A/D converter 20 and input/output interface 22.

The CPU 10 obtains the reference opening amounts of the ink fountain keys 4 of the respective ink colors in accordance with the image area ratios of the respective areas, corresponding to the ink fountain keys 4, of the plate 7 of the respective ink colors by following the "conversion curve of the image area ratio to the opening amount of the ink fountain key" for each ink color (step S202) and stored in the conversion curve memory 25 in advance. The operator then reads out the correction amounts of the opening amounts of the ink fountain keys of the respective ink colors from the correction amount memory 27 (step S203). The CPU 10 then adds the readout correction amounts of the opening amounts of the ink fountain keys of the respective ink colors to the reference opening amounts of the ink fountain keys 4 of the respective ink colors obtained in step S202, thereby obtaining preset values of the opening amounts of the ink fountain keys 4 for the respective ink colors (step S204). More specifically, if the correction amounts are positive amounts, they are uniformly added to the opening amounts of the ink fountain keys 4; if they are negative values, they are uniformly subtracted from the opening amounts of the ink fountain keys 4.

The CPU 10 then reads out the ink feed rates of the respective ink colors from the ink feed rate memory 26 (step S205). The readout ink feed rates of the respective ink colors, and the opening amounts of the ink fountain keys 4 of the respective ink colors obtained in step S204, are set in the CPU 10 through the ink fountain roller drive unit 29 and ink fountain key drive unit 28 (step S206). Printing is then started (step S207).

In this case, the ink feed rates of the respective ink colors in the ink feed rate memory 26 and the correction amounts of the opening amounts of the ink fountain keys of the respective ink colors in the correction amount memory 27 are adjusted such that the reference densities of the respective ink colors unique to the printing company are obtained by repeating steps S108 to S115 before the start of printing regardless of the image area ratios. Therefore, appropriate ink supply amounts can be obtained from the beginning.

More specifically, conventionally, the opening amounts of the ink fountain keys 4 and the ink feed rates, of the respective ink colors are set in accordance with the reference densities unique to the printing company to be employed and the printing environmental conditions, and after that the operator adjusts the opening amounts of the ink fountain keys and the ink feed rates of the respective ink colors without regularity while repeating printing test of the printing products with the plates 7, such that appropriate amounts of inks are supplied. According to this embodiment, such ink supply amount adjustment with the plates 7 being mounted is not necessary. Appropriate amounts of inks can be obtained immediately after the plates 7 are mounted.

According to this embodiment, since the correction amounts of the opening amounts of the ink fountain keys of the respective ink colors are uniform, the correction amounts and ink feed rates can be adjusted before the start of printing easily within a short period of time when compared to a method of setting separate correction amounts in units of ink fountain keys. The basic "conversion curve of the image area ratio to the opening amount of the ink fountain key" determined by the printing machine manufacturer in units of ink colors need not be changed, and the adjusting operation can be simplified.

According to this embodiment, both the correction amounts of the opening amounts of the ink fountain keys and the ink feed rates, of the respective ink colors are adjusted. In some cases, only either the correction amounts of the opening amounts of the ink fountain keys or the ink feed rates, of the respective ink colors need be adjusted. For example, in FIG. 5B, within an image area ratio range where the characteristic curve III of the density translates, a desired density B can be obtained only by adjusting the correction amounts of the opening amounts of the ink fountain keys of the respective ink colors. In FIG. 5A, within an image area ratio range where the characteristic curve II of the density translates, a desired density B can be obtained only by adjusting the ink feed rates of the respective ink colors.

When the density obtained by printing with the conditions set by the printing machine manufacturer exhibits a characteristic curve III as shown in FIG. 5B, the desired density B can be obtained only by adjusting the ink feed rates. When the density obtained by printing exhibits a characteristic curve II shown in FIG. 5A, the desired density B can be obtained only by adjusting the correction amounts of the opening amounts of the ink fountain keys.

Second Embodiment

Figure 6:
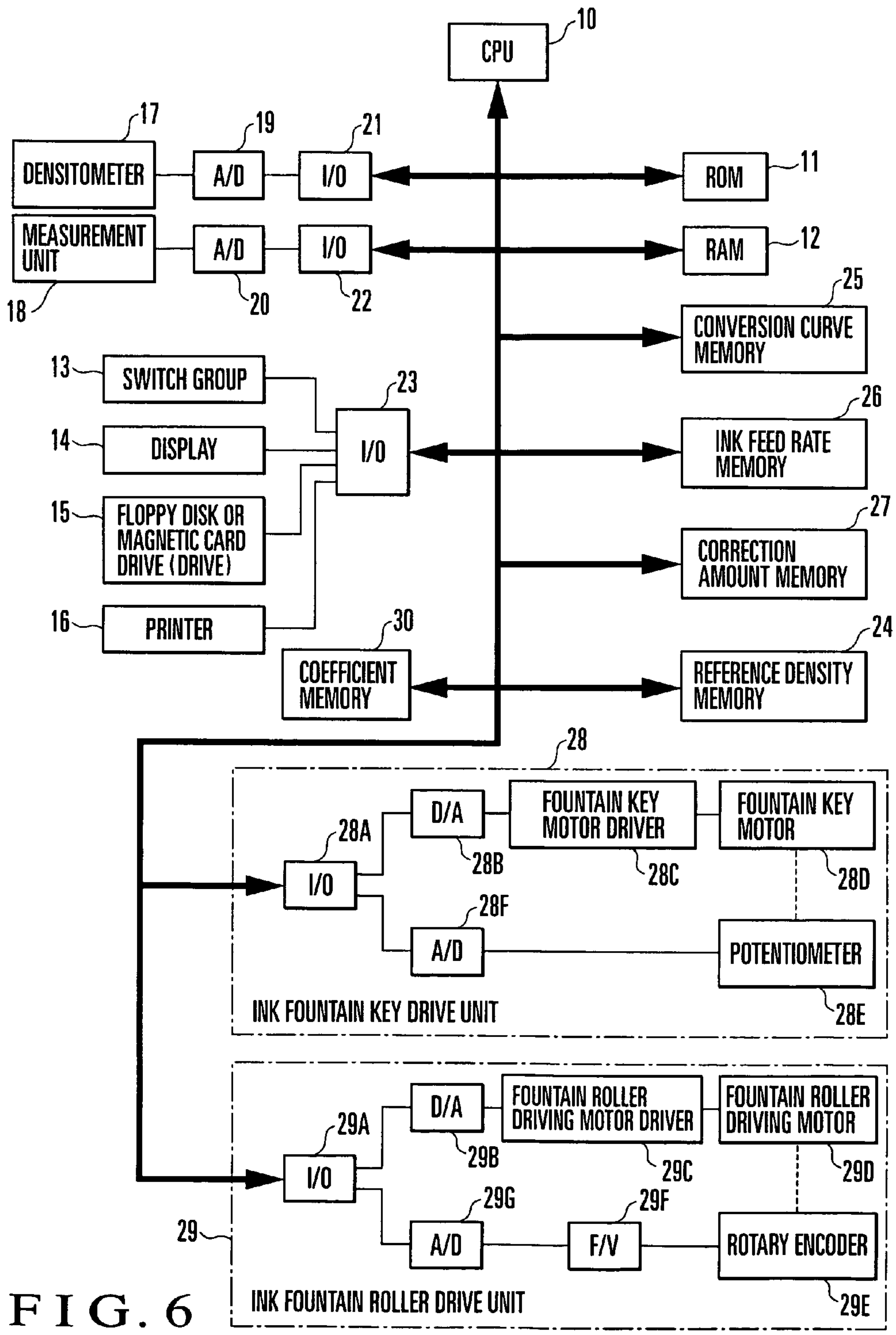
FIG. 6 is a block diagram of an ink supply amount adjusting apparatus for a printing press according to the second embodiment of the present invention.

FIG. 6 shows an ink supply amount adjusting apparatus for a printing press according to the second embodiment of the present invention. Referring to FIG. 6, the same reference numerals as in FIG. 1 denote the same or equivalent constituent elements, and a detailed description thereof will be omitted.

The ink supply amount adjusting apparatus according to this embodiment has, in addition to the arrangement shown in FIG. 1, a coefficient memory 30 for storing the coefficients of ink feed rates in units of ink colors. The coefficients of the ink feed rates in units of ink colors (in units of printing units) are set to "1" when the printing machine is shipped from the manufacturer.

[How to Adjust Correction Amount of Opening Amount of Ink Fountain Key and Coefficient of Ink Feed Rate in Adjustment Before Actual Printing (FIG. 7)]

Prior to the start of printing, the correction amounts of the opening amounts of the ink fountain keys in units of ink colors stored in a correction amount memory 27 and the coefficients of the ink feed rates in units of ink colors stored in a coefficient memory 30 are adjusted. In this adjustment as well, testing plates 7A identical to that shown in FIG. 4 are used.

Figure 2:
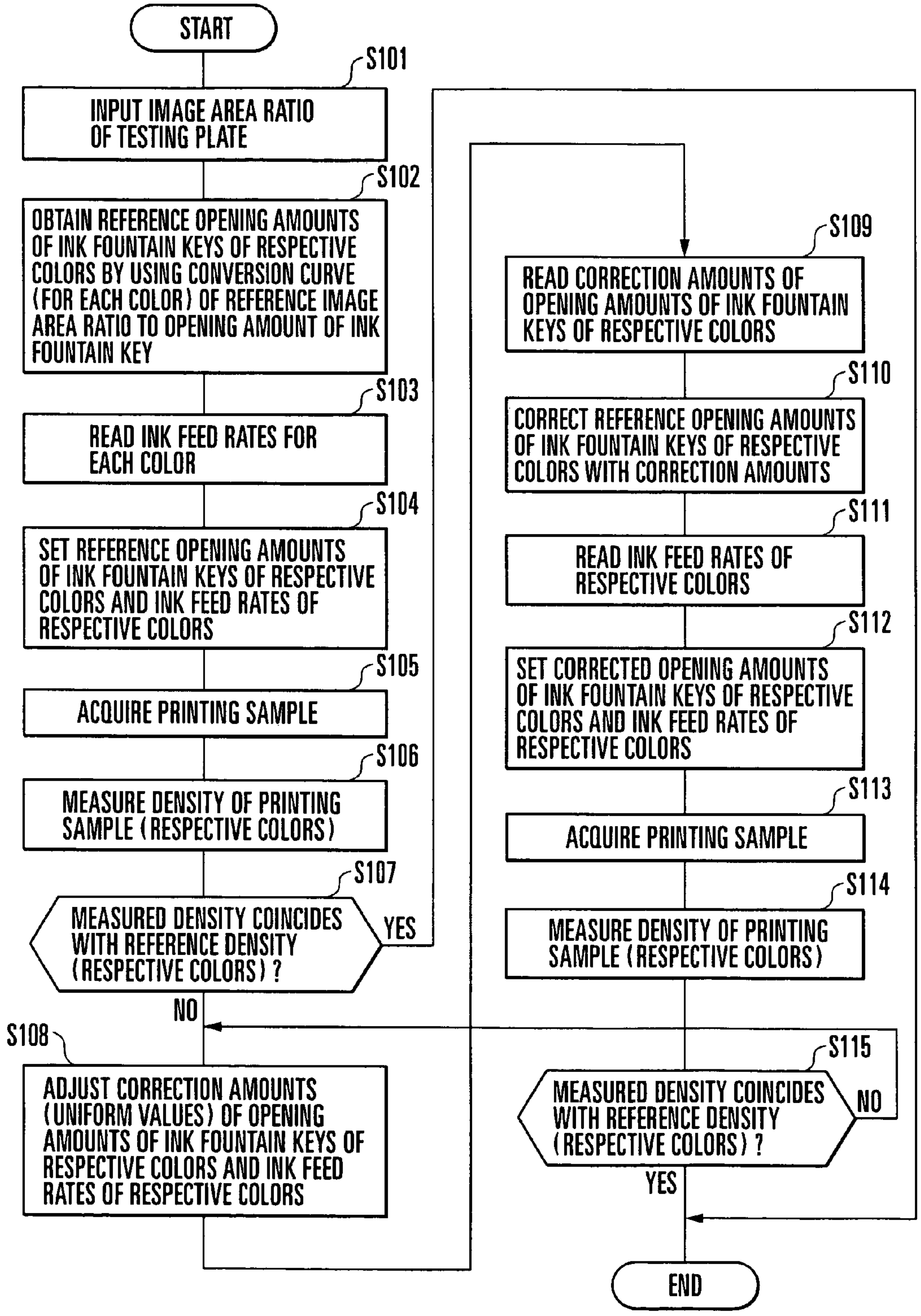
FIG. 2 is a flow chart for explaining the operation of the ink supply amount adjusting apparatus of FIG. 1 before the start of printing.
Figure 7:
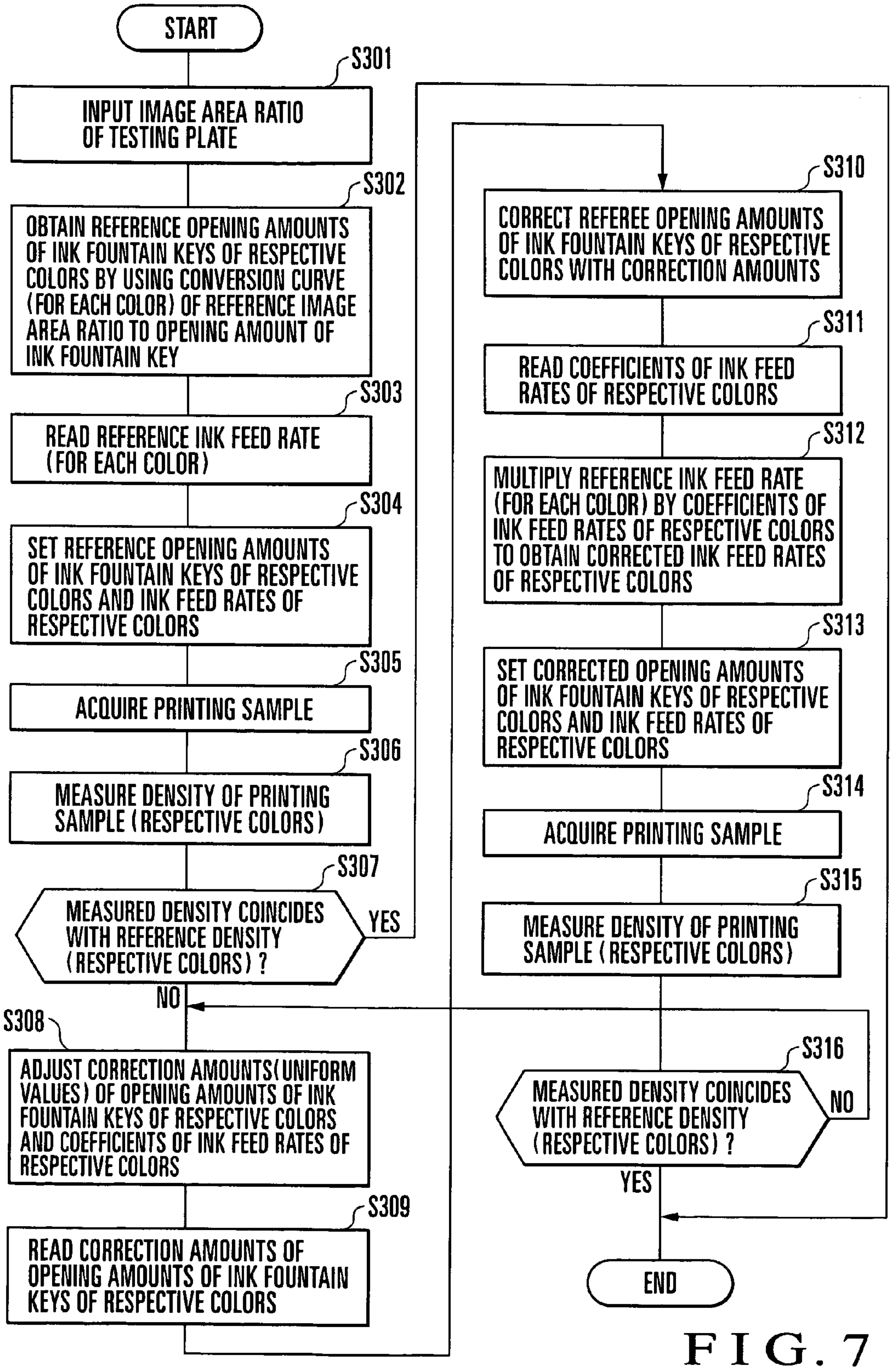
FIG. 7 is a flow chart for explaining the operation of the ink supply amount adjusting apparatus of FIG. 6 before the start of printing.

The processes of steps S301 to S307 and S314 to S316 in FIG. 7 are the same as those of steps S101 to S107 and S113 to S115 in FIG. 2, and a description thereof will accordingly be omitted.

When it is determined in step S307 that the density need be adjusted, the operator adjusts the correction amounts of the opening amounts of the ink fountain keys of the respective ink colors stored in the correction amount memory 27 and the coefficients of the ink feed rates of the respective ink colors stored in the coefficient memory 30 (step S308). More specifically, the operator increases or decreases the current correction amounts of the opening amounts of the ink fountain keys and the current coefficients of the ink feed rates, of the respective ink colors while monitoring them displayed on a display 14. The adjusted correction amounts of the opening amounts of the ink fountain keys and the adjusted coefficients of the ink feed rates, of the respective ink colors are overwritten in the correction amount memory 27 and coefficient memory 30, respectively.

The CPU 10 reads out the adjusted correction amounts of the opening amounts of the ink fountain keys of the respective ink colors from the correction amount memory 27 (step S309). The CPU 10 then adds the readout correction amounts (increments/decrements) of the opening amounts of the ink fountain keys of the respective ink colors to the reference opening amounts of the ink fountain keys 4 of the respective ink colors obtained in step S302, thereby correcting the opening amounts of ink fountain keys 4 of the respective ink colors (step S310). More specifically, if the correction amounts are positive values, they are uniformly added to the opening amounts of the ink fountain keys 4; if they are negative values, they are uniformly subtracted from the opening amounts of the ink fountain keys 4.

The CPU 10 then reads out the adjusted coefficients of the ink feed rates of the respective ink colors from the coefficient memory 30 (step S311). The CPU 10 multiplies the reference ink feed rate for each ink color, read by the step S303, by the readout coefficients of the ink feed rates of the respective ink colors, thereby correcting the ink feed rates of the respective ink colors (step S312). Subsequently, the CPU 10 sets the opening amounts of the ink fountain keys 4 of the respective ink colors obtained in step S310 and the ink feed rates of the respective ink colors obtained in step S312 through an ink fountain key drive unit 28 and ink fountain roller drive unit 29 (step S313). When the setting operation is ended, the flow advances to step S315.

[How to Set Ink Supply Amount at Start of Actual Printing (FIG. 8)]

Figure 3:
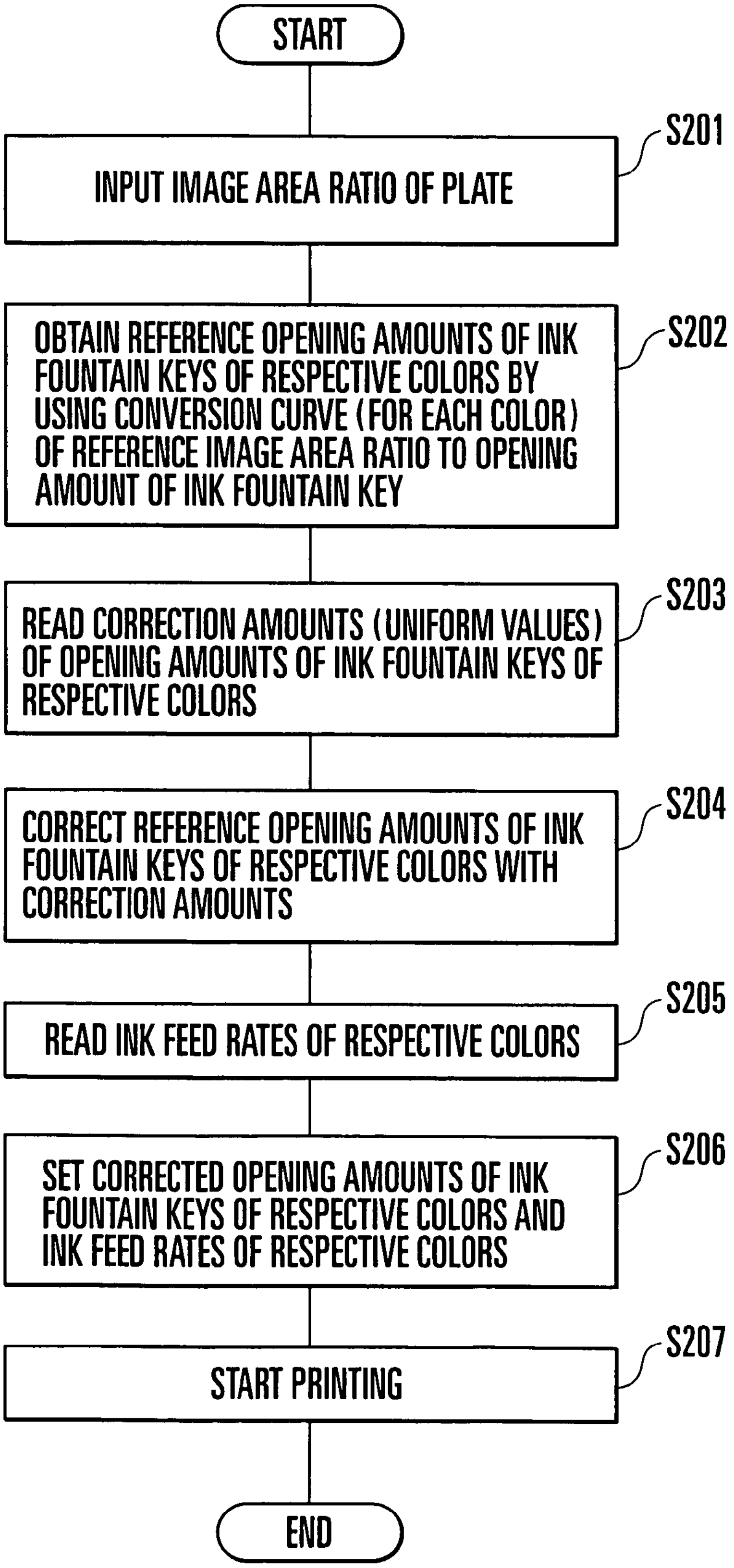
FIG. 3 is a flow chart for explaining the operation of the ink supply amount adjusting apparatus of FIG. 1 at the start of printing.
Figure 8:
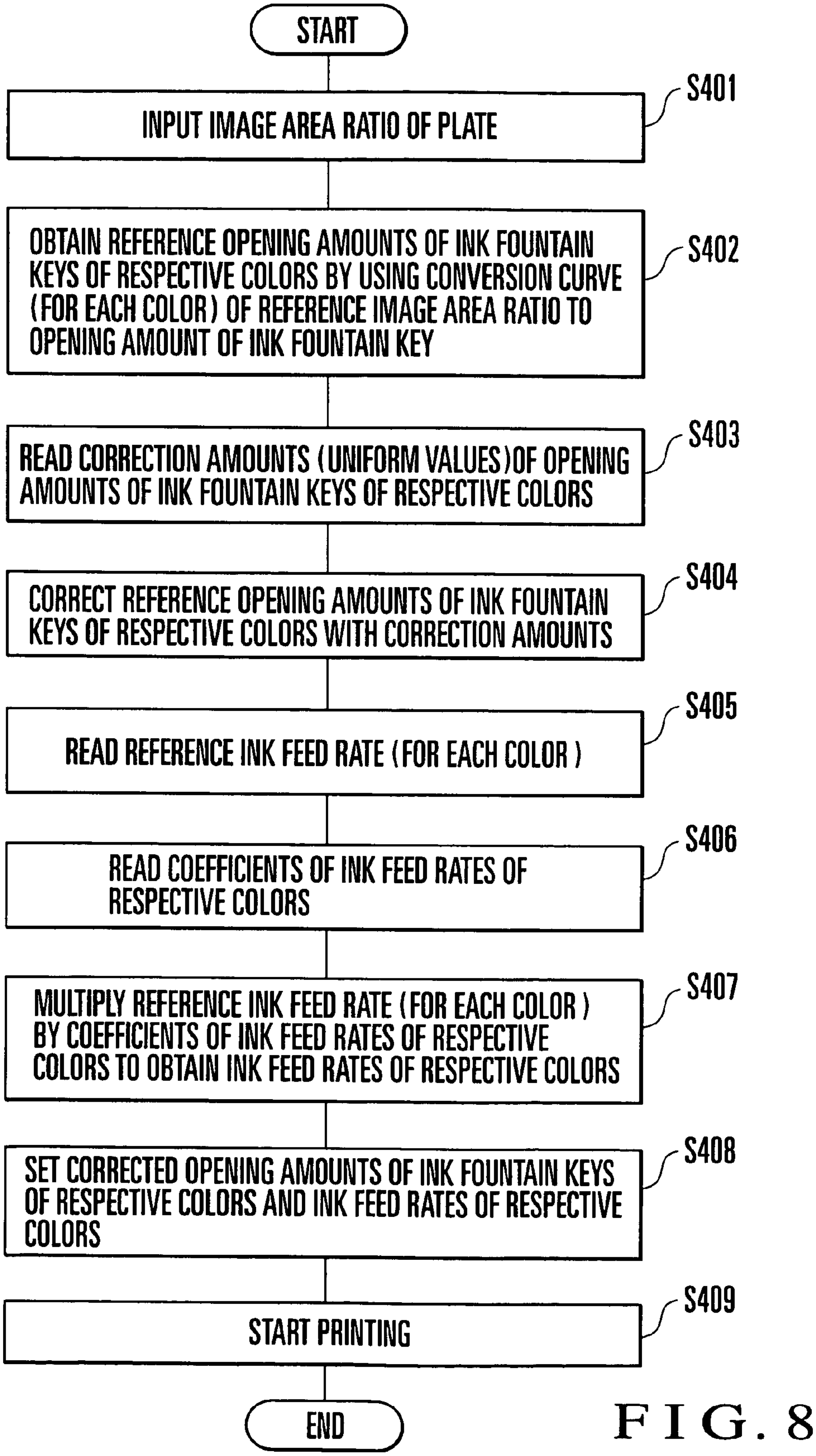
FIG. 8 is a flow chart for explaining the operation of the ink supply amount adjusting apparatus of FIG. 6 at the start of printing.

Processes of steps S401 to S404 in FIG. 8 are the same as those of steps S201 to S204 in FIG. 3, and a description thereof will accordingly be omitted.

The CPU 10 reads out the reference ink feed rate for each ink color from the ink feed rate memory 26 in step S405, and reads the coefficients of the ink feed rates of the respective ink colors from the coefficient memory 30 (step S406). The CPU 10 then multiplies the reference ink feed rate for each ink color, read in step S405, by the readout coefficients of the ink feed rates of the respective ink colors, thereby obtaining preset values of the ink feed rates of the respective ink colors (step S407).

The CPU 10 sets the opening amounts of the ink fountain keys 4 of the respective ink colors obtained in step S404, and the ink feed rates of the respective ink colors obtained in step S407 through the ink fountain key drive unit 28 and ink fountain roller drive unit 29 (step S408). Printing is then started (step S409).

In this embodiment, the ink feed rates of the respective ink colors are corrected by multiplying them by the coefficients. Alternatively, if correction values are obtained and added to the reference ink feed rate, in the same manner as that performed when adjusting the opening amounts of the ink fountain keys, the same effect can be obtained.

Third Embodiment

Figure 9:
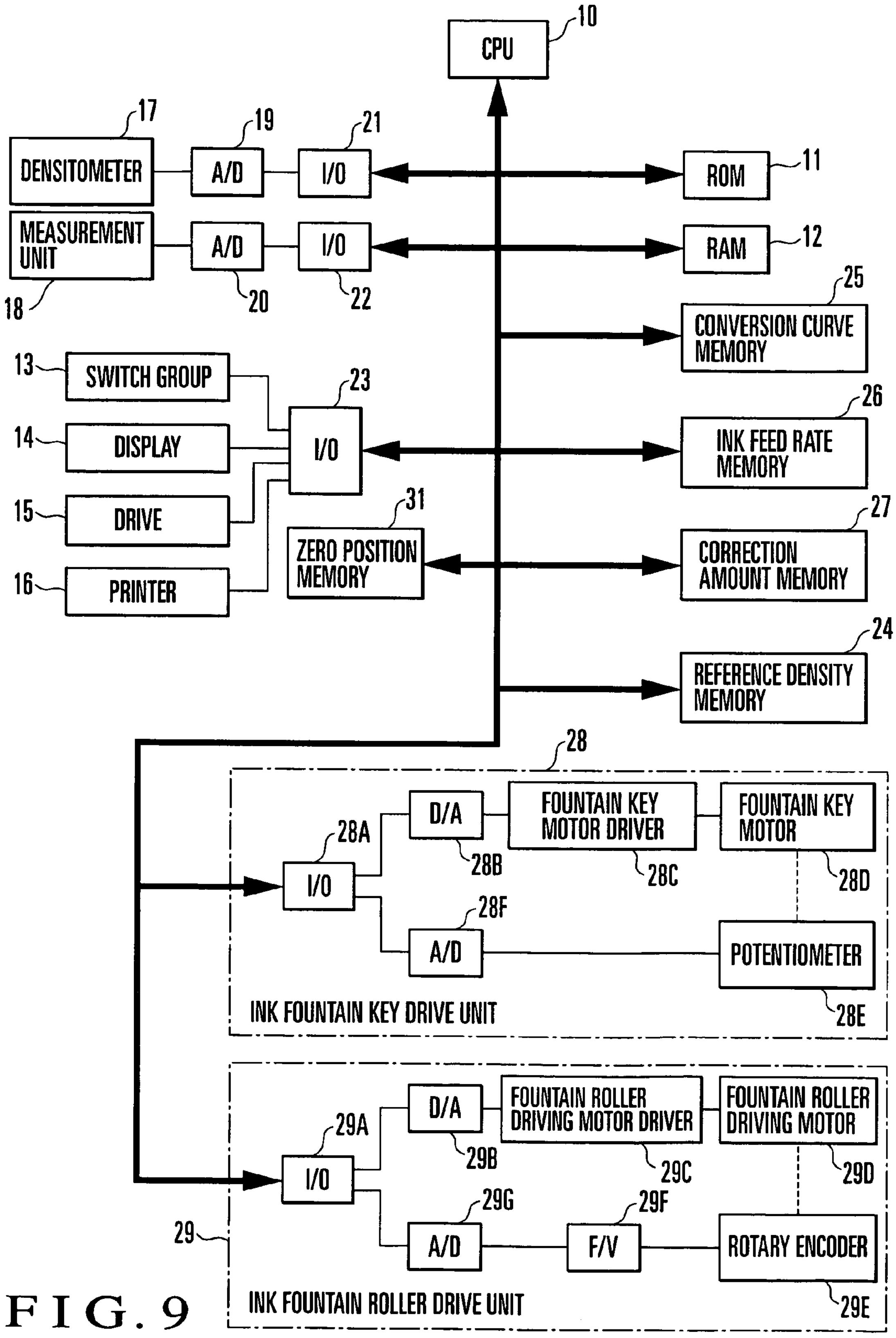
FIG. 9 is a block diagram of an ink supply amount adjusting apparatus for a printing press according to the third embodiment of the present invention.

FIG. 9 shows an ink supply amount adjusting apparatus for a printing press according to the third embodiment of the present invention. Referring to FIG. 9, the same reference numerals as in FIG. 1 denote the same or equivalent constituent elements, and a detailed description thereof will be omitted.

The ink supply amount adjusting apparatus according to this embodiment has, in addition to the arrangement shown in FIG. 1, a zero position memory 31 for storing the zero positions (origin positions) of the opening amounts of the ink fountain keys in units of ink colors.

[How to Adjust Correction Amount of Opening Amount of Ink Fountain Key and Ink Feed Rate in Adjustment Before Actual Printing (FIG. 10)]

Figure 10:
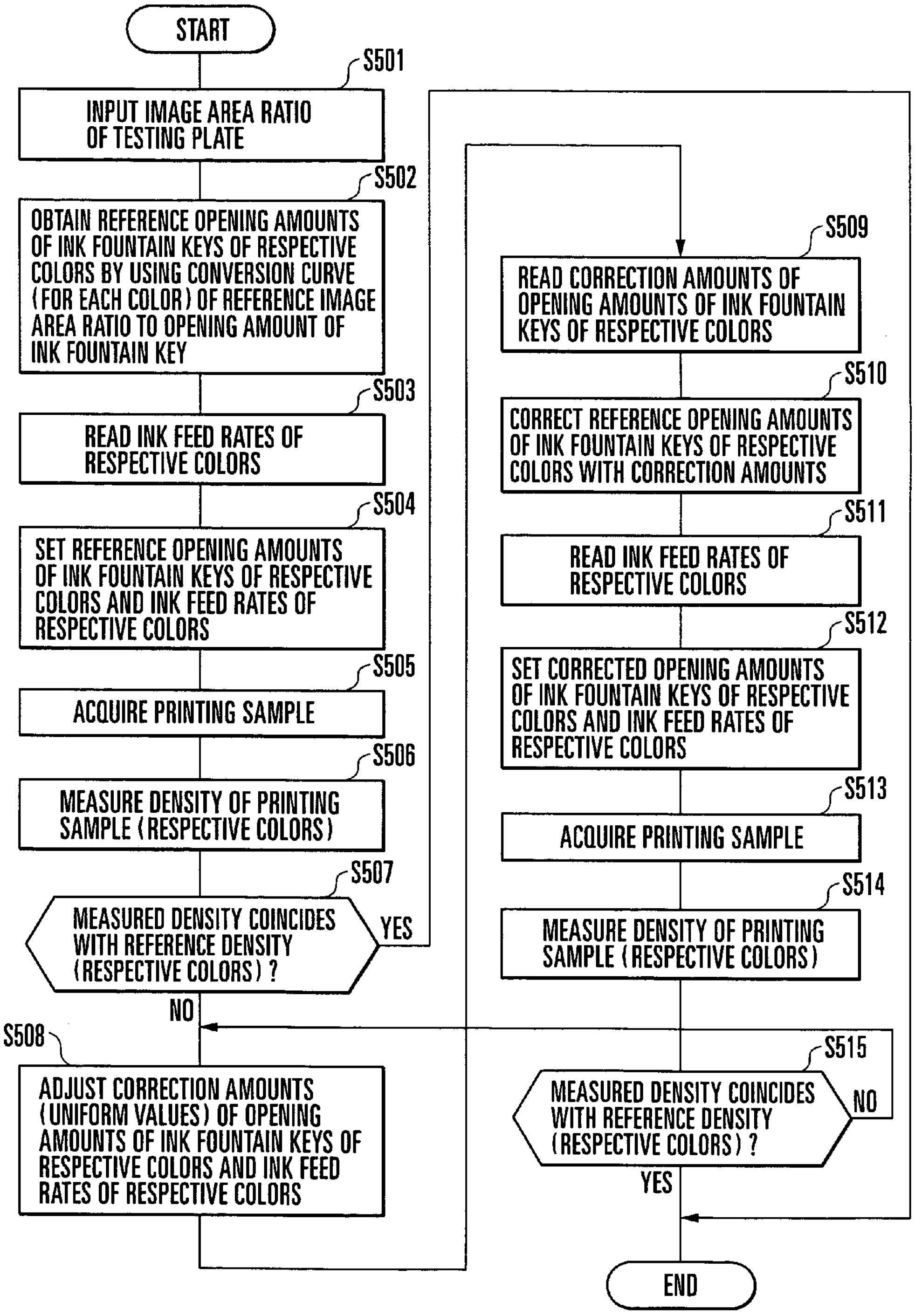
FIG. 10 is a flow chart for explaining the operation of the ink supply amount adjusting apparatus of FIG. 9 before the start of printing.

Prior to the start of printing, the correction amounts of the opening amounts of the ink fountain keys in units of ink colors stored in a correction amount memory 27 and the ink feed rates in units of ink colors stored in an ink feed rate memory 26 are adjusted. In this adjustment as well, testing plates 7A identical to that shown in FIG. 4 are used. The processes of steps S501 to S515 in FIG. 10 are the same as those of steps S101 to S115 in FIG. 2, and a description thereof will be omitted.

Figure 11:
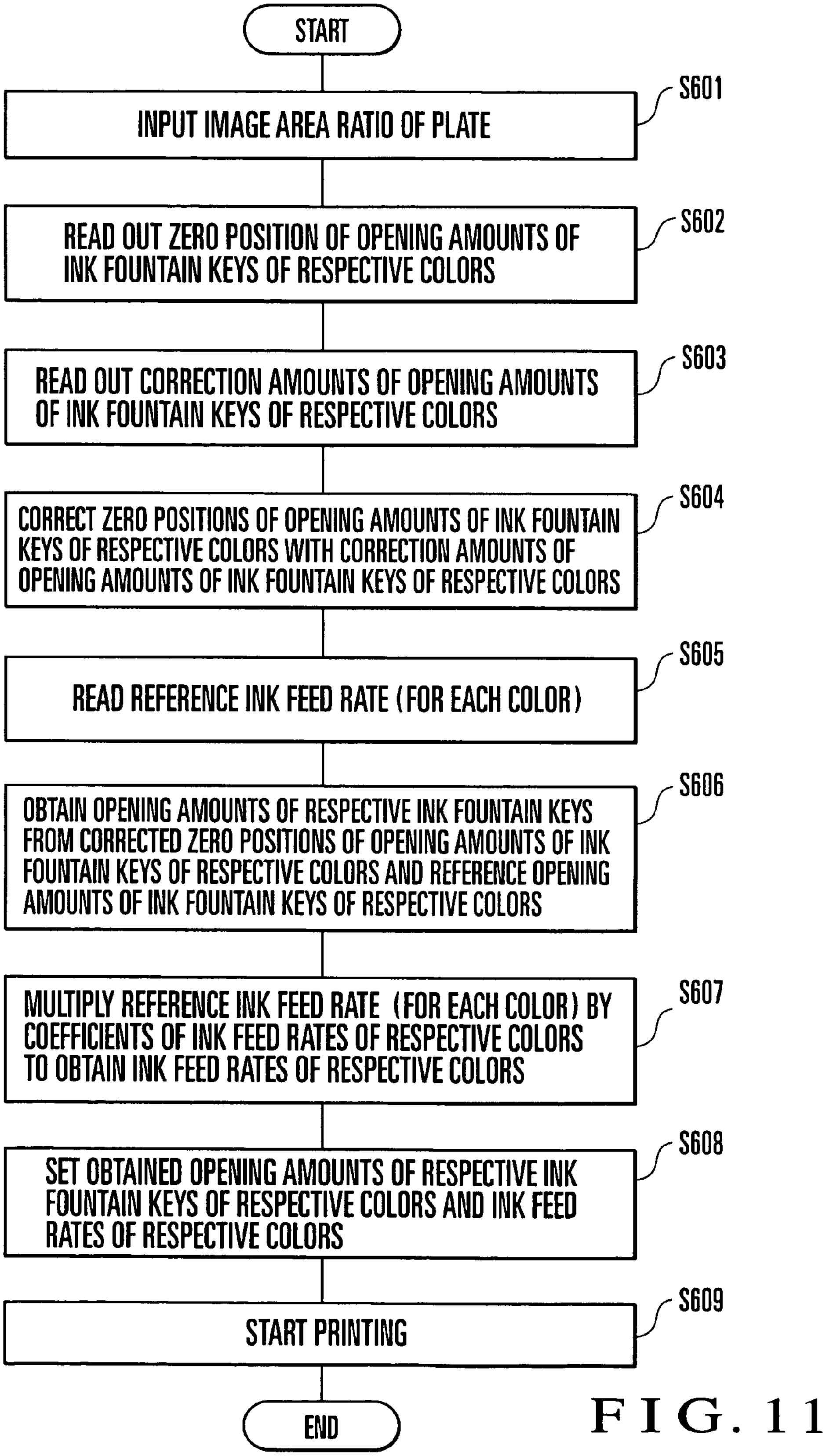
FIG. 11 is a flow chart for explaining the operation of the ink supply amount adjusting apparatus of FIG. 9 at the start of printing.

[How to Set Ink Supply Amount at Start of Actual Printing (FIG. 11)]

The operator measures the image area ratio of the testing plate 7A with a measurement unit 18 and supplies it to a CPU 10 (step S601). The CPU 10 reads out the zero positions of the opening amounts of the ink fountain keys of the respective ink colors stored in the zero position memory 31 (step S602), and the correction amounts of the opening amounts of the ink fountain keys of the respective ink colors stored in the correction amount memory 27 (step S603). Subsequently, the CPU 10 adds the correction amounts (increments/decrements) of the opening amounts of the ink fountain keys of the respective ink colors to the readout zero positions of the opening amounts of the ink fountain keys of the respective ink colors, thereby correcting the zero positions of the opening amounts of the ink fountain keys of the respective ink colors (step S604). More specifically, if the correction amounts are positive values, they are uniformly added to the zero positions of the opening amounts of the ink fountain keys; if they are negative values, they are uniformly subtracted from the zero positions of the opening amounts of the ink fountain keys.

The CPU 10 obtains the reference opening amounts of the ink fountain keys 4 of the respective ink colors in accordance with the image area ratios of the respective areas, corresponding to the ink fountain keys 4, of the plates 7 of the respective ink colors by following the "conversion curve of the image area ratio to the opening amount of the ink fountain key" for each ink color (step S605) and stored in a conversion curve memory 25 in advance. The operator then obtains the opening amounts of the ink fountain keys of the respective ink colors from the corrected zero positions of the opening amounts of the ink fountain keys of the respective ink colors obtained in step S604 and the reference opening amounts of the ink fountain keys of the respective ink colors obtained in step S605 (step S606).

The CPU 10 reads out the ink feed rates of the respective ink colors from the ink feed rate memory 26 (step S607). The CPU 10 then sets the readout ink feed rates of the respective ink colors and the opening amounts of ink fountain keys 4 of the respective ink colors obtained in step S606 through an ink fountain roller drive unit 29 and ink fountain key drive unit 28 (step S608). After that, printing is started (step S609).

In this case, the opening amounts of the ink fountain keys 4 of the respective ink colors are set with reference to the corrected zero positions of the opening amounts of the ink fountain keys of the respective ink colors. More specifically, the opening amounts of the ink fountain keys 4 of the respective ink colors are set with reference to the zero positions that are adjusted such that the reference densities of the respective ink colors unique to the printing company can be obtained regardless of the image area ratio. Therefore, when the setting operation of the opening amounts is combined with the setting operation of the ink feed rates of the respective ink colors read from the ink feed rate memory 26, appropriate ink supply amounts can be obtained from the beginning.

Fourth Embodiment

Figure 12:
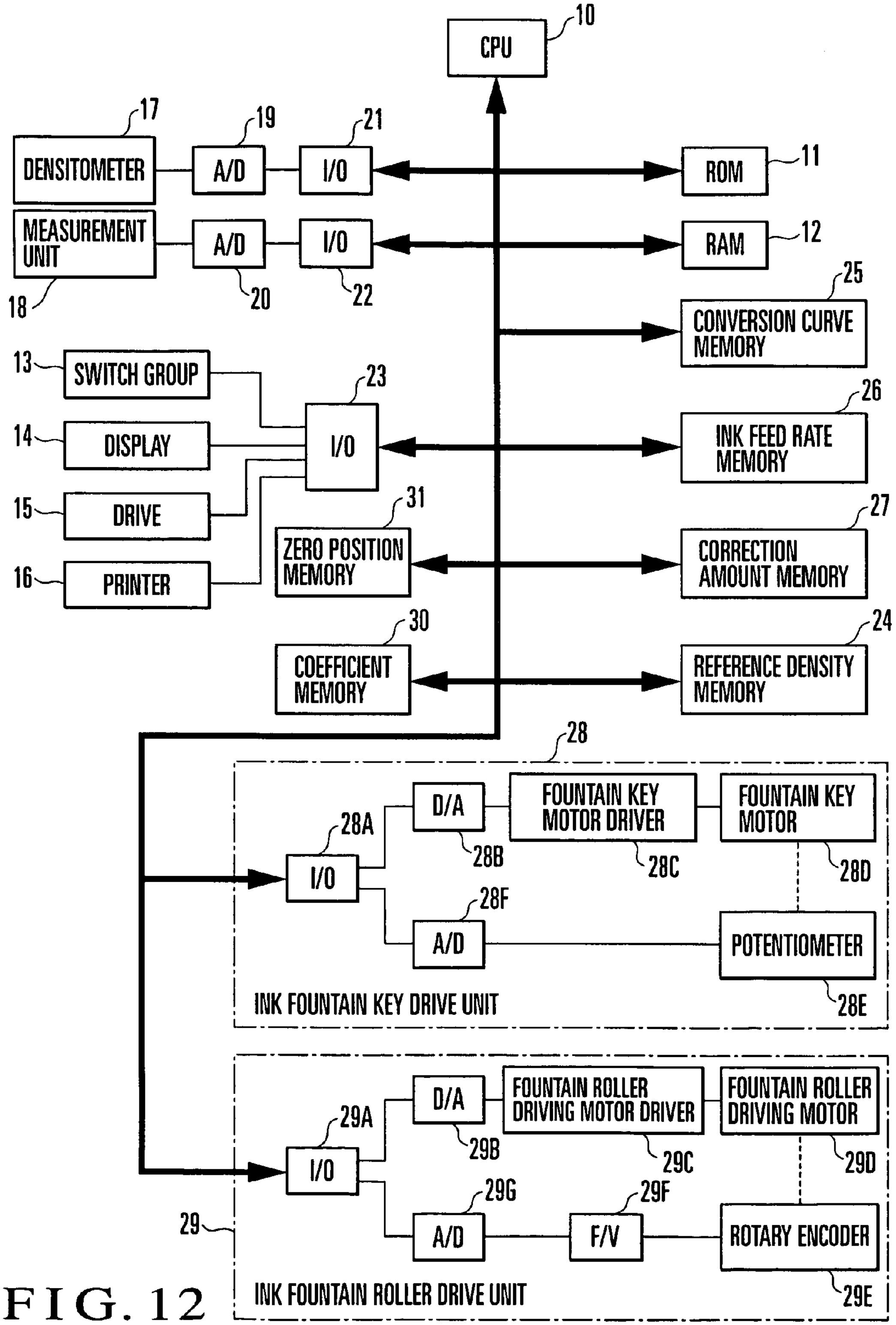
FIG. 12 is a block diagram of an ink supply amount adjusting apparatus for a printing press according to the fourth embodiment of the present invention.

FIG. 12 shows an ink supply amount adjusting mechanism for a printing press according to the fourth embodiment of the present invention. Referring to FIG. 12, the same reference numerals as in FIG. 6 denote the same or equivalent constituent elements, and a detailed description thereof will be omitted.

The ink supply amount adjusting mechanism according to this embodiment has, in addition to the arrangement shown in FIG. 6, a memory 31 for storing the zero positions (origin positions) of the opening amounts of the ink fountain keys in units of ink colors.

[How to Adjust Correction Amount of Opening Amount of Ink Fountain Key and Coefficient of Ink Feed Rate in Adjustment Before Actual Printing (FIG. 13)]

Figure 13:
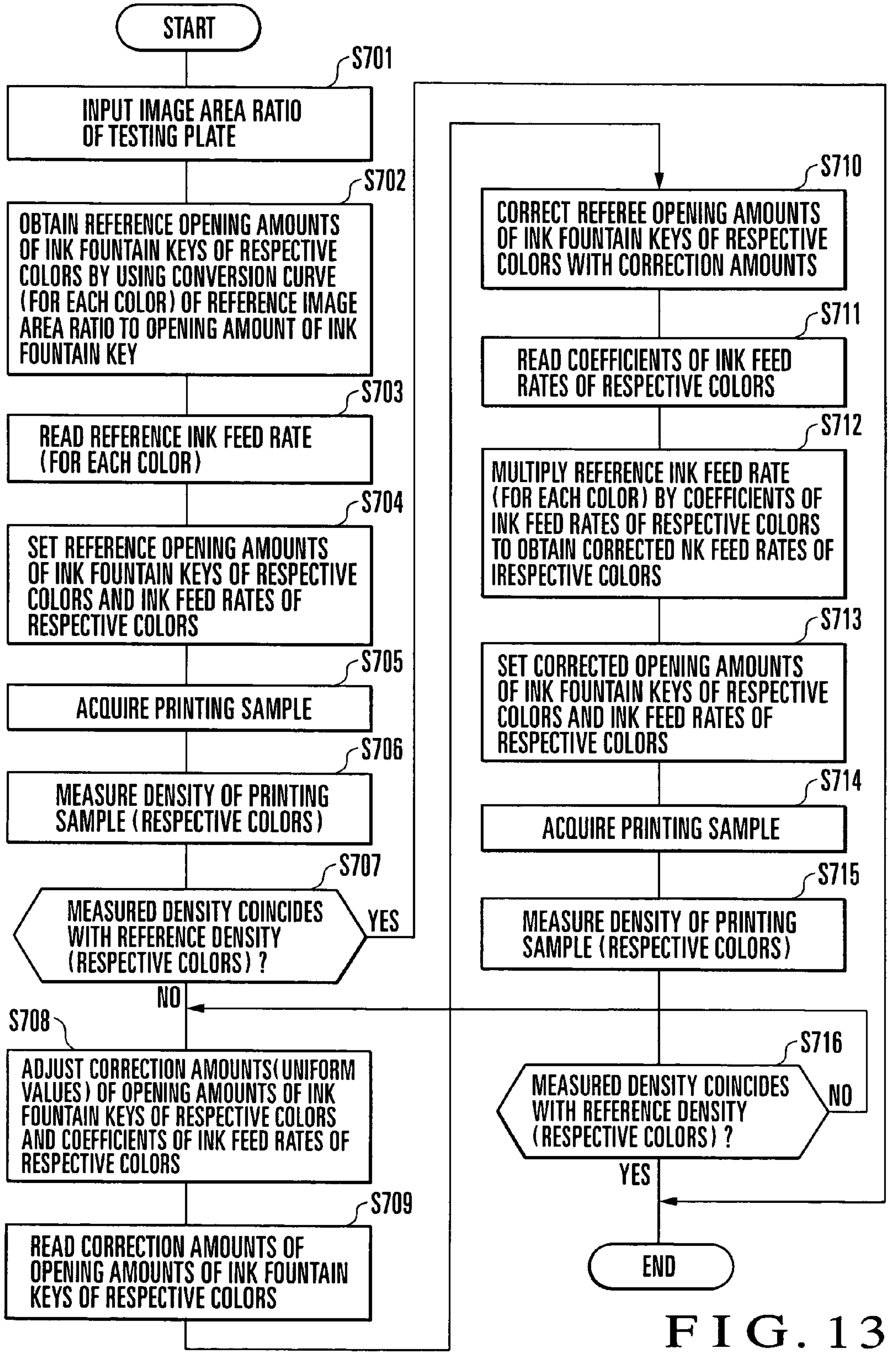
FIG. 13 is a flow chart for explaining the operation of the ink supply amount adjusting apparatus of FIG. 12 before the start of printing.

Prior to the start of printing, the correction amounts of the opening amounts of the ink fountain keys in units of ink colors stored in a correction amount memory 27 and the coefficients of the ink feed rates in units of ink colors stored in a memory 30 are adjusted. In this adjustment as well, testing plates 7A identical to that shown in FIG. 4 are used. The processes of steps S701 to S716 in FIG. 13 are the same as those of steps S301 to S316 in FIG. 7, and a description thereof will be omitted.

[How to Set Ink Supply Amount at Start of Actual Printing (FIG. 14)]

The operator measures the image area ratio of the testing plate 7A with a measurement unit 18 and supplies it to a CPU 10 (step S801). The CPU 10 reads out the zero positions of the opening amounts of the ink fountain keys of the respective ink colors stored in the zero position memory 31 (step S802), and the correction amounts of the opening amounts of the ink fountain keys of the respective ink colors stored in the correction amount memory 27 (step S803). Subsequently, the CPU 10 adds the correction amounts (increments/decrements) of the opening amounts of the ink fountain keys of the respective ink colors to the readout zero positions of the opening amounts of the ink fountain keys of the respective ink colors, thereby correcting the zero positions of the opening amounts of the ink fountain keys of the respective ink colors (step S804). More specifically, if the correction amounts are positive values, they are uniformly added to the zero positions of the opening amounts of the ink fountain keys; if they are negative values, they are uniformly subtracted from the zero positions of the opening amounts of the ink fountain keys.

The CPU 10 obtains the reference opening amounts of the ink fountain keys 4 of the respective ink colors in accordance with the image area ratios of the respective areas, corresponding to ink fountain keys, of the plate 7 of the respective ink colors 4 by following the “conversion curve of the image area ratio to the opening amount of the ink fountain key” for each ink color (step S805) stored in a conversion curve memory 25 in advance. The CPU 10 then obtains the opening amounts of the ink fountain keys of the respective ink colors from the corrected zero positions of the opening amounts of the ink fountain keys of the respective ink colors obtained in step S804 and the reference opening amounts of the ink fountain keys of the respective ink colors obtained in step S805 (step S806).

The CPU 10 reads out the reference ink feed rate common to the ink colors from an ink feed rate memory 26 (step S807), and the coefficients of the ink feed rates of the respective ink colors from the coefficient memory 30 (step S808). The CPU 10 then multiplies the reference ink feed rate for each ink color read in step S807 by the readout coefficients of the ink feed rates of the respective ink colors, thereby obtaining preset values of the ink feed rates of the respective ink colors (step S809).

The CPU 10 sets the opening amounts of the ink fountain keys 4 of the respective ink colors obtained in step S806 and the ink feed rates of the respective ink colors obtained in step S809 through an ink fountain key drive unit 28 and ink fountain roller drive unit 29. After that, printing is started (step S811).

In this case, the opening amounts of the ink fountain keys 4 of the respective ink colors are set with reference to the corrected zero positions of the opening amounts of the ink fountain keys of the respective ink colors. More specifically, the opening amounts of the ink fountain keys 4 of the respective ink colors are set with reference to the zero positions that are adjusted such that the reference densities of the respective ink colors unique to the printing company can be obtained regardless of the image area ratio. Therefore, when the setting operation of the opening amounts is combined with the setting operation of the ink feed rates of the respective ink colors obtained in step S809, appropriate ink supply amounts can be obtained from the beginning.

In this embodiment, the ink feed rates of the respective ink colors are corrected by multiplying them by the coefficients. Alternatively, if correction values are obtained and added to the reference ink feed rates, in the same manner as that performed when adjusting the opening amounts of the ink fountain keys, the same effect can be obtained.

Figure 17A:
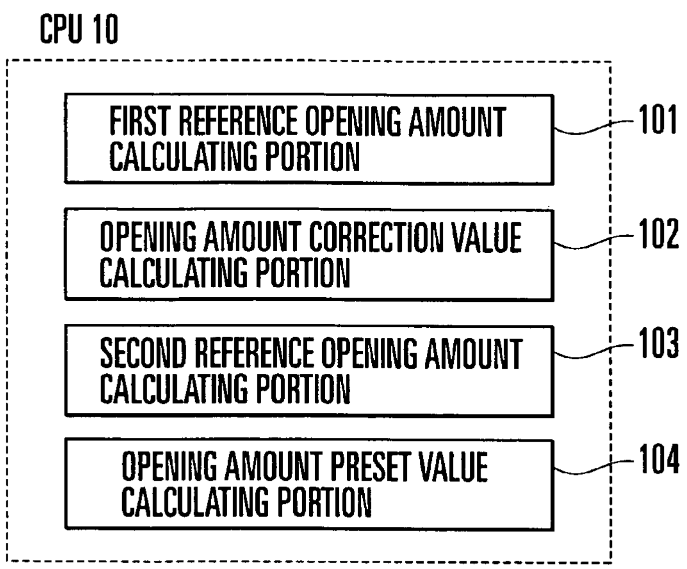
FIGS. 17A, 17B, and 17C are function block diagrams of the CPUs respectively shown in FIGS. 1, 9, and 12.
Figure 17B:
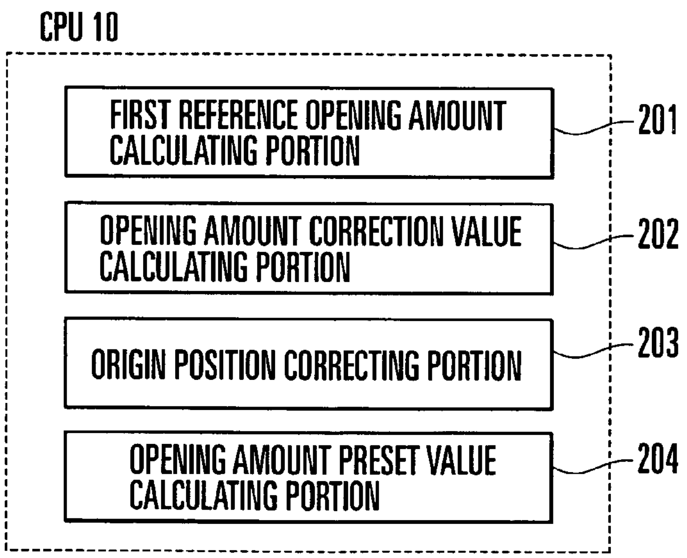
Figure 17C:
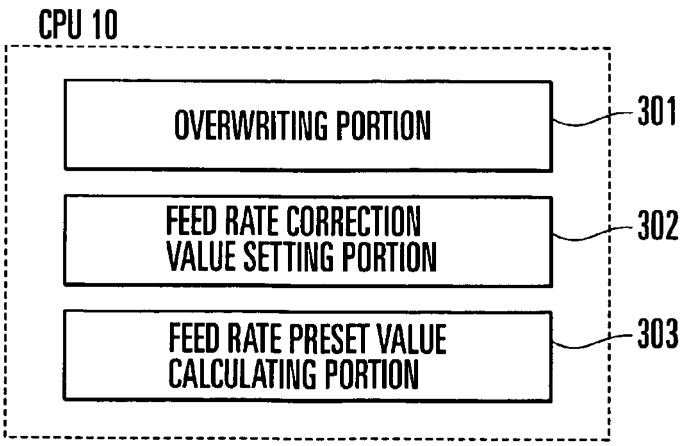

FIGS. 17A, 17B, and 17C show the relationships between the function blocks of the CPUs 10 of FIGS. 1, 9, and 12 and their processing steps. In the CPU 10 of FIG. 1 shown in FIG. 17A, a first reference opening amount calculating portion 101 performs the process of step S102 of FIG. 2, and an opening amount correction value calculating portion 102 performs the processes of steps S108 to S115 of FIG. 2. A second reference opening amount calculating portion 103 performs the process of step S202 of FIG. 3, and an opening amount preset value calculating portion 104 performs the process of step S206 of FIG. 3. The same applies to the CPU 10 shown in FIG. 6.

In the CPU 10 of FIG. 9 shown in FIG. 17B, a first reference opening amount calculating portion 201 performs the process of step S502 of FIG. 10, and an opening amount correction value calculating portion 202 performs the processes of steps S508 to S515 of FIG. 10. An origin position correcting portion 203 performs the process of step S604 of FIG. 11, and an opening amount preset value calculating portion 204 performs the process of step S606 of FIG. 11.

Figure 14:
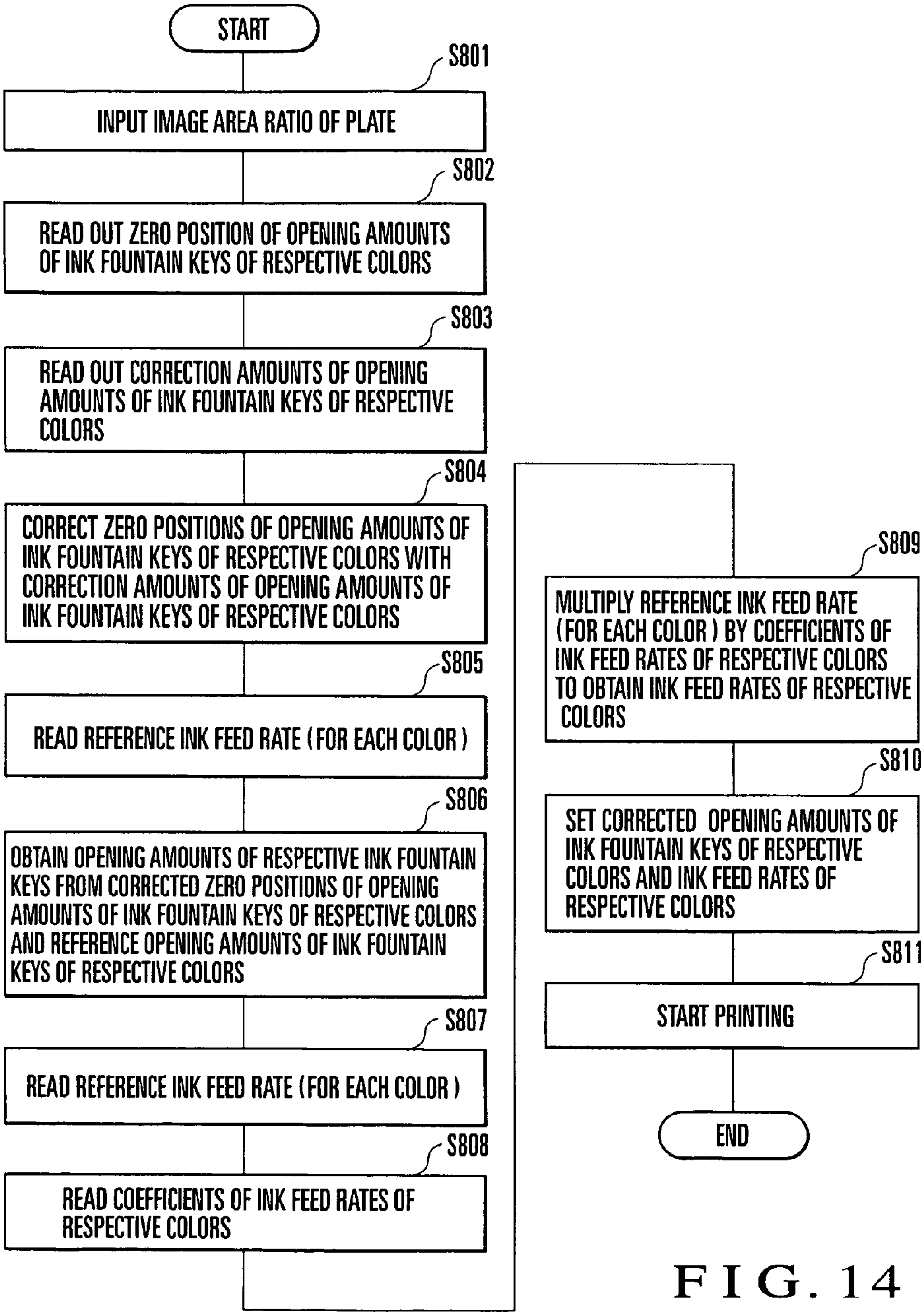
FIG. 14 is a flow chart for explaining the operation of the ink supply amount adjusting apparatus of FIG. 12 at the start of printing.

In the CPU 10 of FIG. 12 shown in FIG. 17C, an overwriting portion 301 performs the processes of steps S708 to S716 of FIG. 13, a feed rate correction value setting portion 302 performs the process of step S808 of FIG. 14, and a feed rate preset value calculating portion 303 performs the process of step S809 of FIG. 14. A CPU 10 of FIG. 12 can also have at least one functional block of the CPUs 10 of FIGS. 1 and 9.

As has been described above, according to the present invention, in particular, color matching in actual printing can be more effectively facilitated within a short period of time. In particular, when at least one of the correction amounts/origin positions of the opening amounts of the ink fountain keys of the respective ink colors and the correction values of the ink feed rates of the respective ink colors is adjusted such that the reference densities of the respective ink colors unique to the printing company can be obtained regardless of the image area ratio before the start of printing, a higher effect can be obtained. As the relationship between the image area ratio and the opening amounts of the ink fountain keys, it suffices if only one reference value is set to be common to the respective ink colors. Therefore, a large memory capacity is not needed, and the image capacity can be reduced greatly.

According to the present invention, the correction amounts of the opening amounts of the ink fountain keys and the correction amounts of the ink feed rates, of the ink colors can be overwritten. Therefore, the amount of ink to be supplied, which varies depending on the printing companies and the differences in the environment, can be adjusted easily within a short period of time by adjusting the correction values (increments/decrements) of the opening amounts of the ink fountain keys and the correction amounts of the ink feed rates, of the ink colors before the start of printing.

What is claimed is:

1. An ink supply amount adjusting method for a printing press having an ink fountain for storing an ink, an ink fountain roller to which said ink is supplied from said ink fountain, a plurality of ink fountain keys aligned in an axial direction of said ink fountain roller to adjust an amount of ink to be supplied from said ink fountain to said ink fountain roller, and an ink roller group for supplying said ink to a plate in an amount adjusted in accordance with a feed rate of said ink fountain roller, comprising the steps of obtaining reference opening amounts of said ink fountain keys in accordance with image area ratios of respective areas, corresponding to said ink fountain keys, of said plate by following a preset separate conversion curve of a respective ink color, of the relationship between an image area ratio and opening amounts of said ink fountain keys, and uniformly correcting the obtained reference opening amounts of said ink fountain keys with preset correction values, thereby obtaining set values of the opening amounts of said ink fountain keys.

2. A method according to claim 1, further comprising the step of overwriting the correction values of the opening amounts of said ink fountain keys.

3. A method according to claim 2, wherein the overwriting step comprises the steps of obtaining the reference opening amounts of said ink fountain keys, prior to start of actual printing, by following the preset relationship between the image area ratio and the opening amounts of said ink fountain keys, and obtaining correction values of the obtained reference opening amounts of said ink fountain keys on the basis of measured densities of a printing sample printed by using testing plates having the same image area ratio.

4. An ink supply amount adjusting method for a printing press having an ink fountain for storing an ink, an ink fountain roller to which said ink is supplied from said ink fountain, a plurality of ink fountain keys aligned in an axial direction of said ink fountain roller to adjust an amount of ink to be supplied from said ink fountain to said ink fountain roller, and an ink roller group for supplying said ink to a plate in an amount adjusted in accordance with a feed rate of said ink fountain roller, comprising the steps of uniformly presetting correction values of opening amounts of said ink fountain keys, correcting origin positions of the opening amounts of said ink fountain keys by using the preset correction values, and setting the opening amounts of said ink fountain keys in accordance with image area ratios of respective areas, corresponding to said ink fountain keys, of said plate by following a preset separate conversion curve of a respective ink color, of the relationship between an image area ratio and the opening amounts of said ink fountain keys.

5. A method according to claim 4, further comprising the step of overwriting the correction values of the opening amounts of said ink fountain keys.

6. A method according to claim 5, wherein the overwriting step comprises the steps of obtaining reference opening amounts of said ink fountain keys, prior to start of actual printing, by following the preset relationship between the image area ratio and the opening amounts of said ink fountain keys, and obtaining correction values of the obtained reference opening amounts of said ink fountain keys on the basis of measured densities of a printing sample printed by using testing plates having the same image area ratio.

7. An ink supply amount adjusting method for a printing press having an ink fountain for storing an ink, an ink fountain roller to which said ink is supplied from said ink fountain, a plurality of ink fountain keys aligned in an axial direction of said ink fountain roller to adjust an amount of ink to be supplied from said ink fountain to said ink fountain roller, and an ink roller group for supplying said ink to a plate in an amount adjusted in accordance with a feed rate of said ink fountain roller, comprising the steps of presetting correction values of feed rates of said ink fountain rollers, and correcting a preset reference feed rate of said ink fountain roller wherein the feed rate is determined for a respective ink color by using the preset correction values, thereby setting the feed rates of said ink fountain rollers.

8. A method according to claim 7, further comprising the step of overwriting the correction values of the feed rates of said ink fountain rollers.

9. A method according to claim 7, further comprising the steps of obtaining reference opening amounts of said ink fountain keys in accordance with image area ratios of respective areas, corresponding to said ink fountain keys, of said plate by following a preset relationship between an image area ratio and the opening amounts of said ink fountain keys, and uniformly correcting the obtained reference opening amounts of said ink fountain keys with the preset correction values, thereby obtaining set values of the opening amounts of said ink fountain keys.

10. A method according to claim 7, further comprising the steps of uniformly setting the correction values of the opening amounts of said ink fountain keys, correcting origin positions of the opening amounts of said ink fountain keys by using the preset correction values, and obtaining the opening amounts of said ink fountain keys in accordance with image area ratios of respective areas, corresponding to said ink fountain keys, of said plate by following a preset relationship between an image area ratio and the opening amounts of said ink fountain keys.

11. An ink supply amount adjusting apparatus for a printing press having an ink fountain for storing an ink, an ink fountain roller to which said ink is supplied from said ink fountain, a plurality of ink fountain keys aligned in an axial direction of said ink fountain roller to adjust an amount of ink to be supplied from said ink fountain to said ink fountain roller, and an ink roller group for supplying said ink to a plate in an amount adjusted in accordance with a feed rate of said ink fountain roller, comprising first calculating means for obtaining reference opening amounts of said ink fountain keys in accordance with image area ratios of respective areas, corresponding to said ink fountain keys, of said plate by following a preset separate conversion curve of a respective ink color, of the relationship between an image area ratio and opening amounts of said ink fountain keys, and second calculating means for uniformly correcting the reference opening amounts of said ink fountain keys output from said first calculating means with preset correction amounts, thereby obtaining set values of the opening amounts of said ink fountain keys.

12. An apparatus according to claim 11, further comprising overwriting means for overwriting the correction values of the opening amounts of said ink fountain keys.

13. An apparatus according to claim 12, wherein said overwriting means comprises third calculating means for obtaining the reference opening amounts of said ink fountain keys, prior to start of actual printing, by following the preset relationship between the image area ratio and the opening amounts of said ink fountain keys, and setting means for setting the correction values of the reference opening amounts of said ink fountain keys output from said third calculating means on the basis of measured densities of a printing sample printed by using testing plates having the same image area ratio.

14. An ink supply amount adjusting apparatus for a printing press having an ink fountain for storing an ink, an ink fountain roller to which said ink is supplied from said ink fountain, a plurality of ink fountain keys aligned in an axial direction of said ink fountain roller to adjust an amount of ink to be supplied from said ink fountain to said ink fountain roller, and an ink roller group for supplying said ink to a plate in an amount adjusted in accordance with a feed rate of said ink fountain roller, comprising correction means for correcting origin positions of the opening amounts of said ink fountain keys by using the preset correction values of the opening amounts of said ink fountain keys, and first calculating means for obtaining set values of the opening amounts of said ink fountain keys in accordance with image area ratios of respective areas, corresponding to said ink fountain keys, of said plate by following a preset separate conversion curve of a respective ink color, of the relationship between an image area ratio and opening the amounts of said ink fountain keys.

15. An apparatus according to claim 14, further comprising overwriting means for overwriting the correction values of the opening amounts of said ink fountain keys.

16. An apparatus according to claim 15, wherein said rewriting means comprises second calculating means for obtaining reference opening amounts of said ink fountain keys, prior to start of actual printing, by following the relationship between the preset image area ratio and the opening amounts of said ink fountain keys, and setting means for setting correction values of the reference opening amounts of said ink fountain keys output from said second calculating means on the basis of measured densities of a printing sample printed by using testing plates having the same image area ratio.

17. An ink supply amount adjusting apparatus for a printing press having an ink fountain for storing an ink, an ink fountain roller to which said ink is supplied from said ink fountain, a plurality of ink fountain keys aligned in an axial direction of said ink fountain roller to adjust an amount of ink to be supplied from said ink fountain to said ink fountain roller, and an ink roller group for supplying said ink to a plate in an amount adjusted in accordance with a feed rate of said ink fountain roller, comprising presetting means for presetting correction values of feed rates of said ink fountain rollers, and first calculating means for correcting a preset reference feed rate of said ink fountain roller wherein the feed rate is determined from a separate conversion curve for a respective ink color by using the correction values obtained by said setting means, thereby obtaining set values of the feed rates of said ink fountain rollers.

18. An apparatus according to claim 17, further comprising overwriting means for overwriting the correction values of the feed rates of said ink fountain rollers.

19. An apparatus according to claim 17, further comprising second calculating means for obtaining reference opening amounts of said ink fountain keys in accordance with image area ratios of respective areas, corresponding to said ink fountain keys, of said plate by following a preset relationship between an image area ratio and the opening amounts of said ink fountain keys, and third calculating means for uniformly correcting the reference opening amounts of said ink fountain keys output from said second calculating means with preset correction values, thereby obtaining set values of the opening amounts of said ink fountain keys.

20. An apparatus according to claim 17, further comprising correcting means for correcting origin positions of the opening amounts of said ink fountain keys with the preset correction values of the opening amounts of said ink fountain keys, and second calculating means for obtaining set values of the opening amounts of said ink fountain keys in accordance with image area ratios of respective areas, corresponding to said ink fountain keys, of said plate by following a preset relationship between an image area ratio and the opening amounts of said ink fountain keys.

* * * * *